UNITED STATES PATENT OFFICE.

EDWARD G. GRIFFIN, OF CLIFFSIDE, NEW JERSEY, ASSIGNOR TO THE BARRETT COMPANY, A CORPORATION OF NEW JERSEY.

PROCESS OF MAKING SALTS OF ANTHRAQUINONE SULFONIC ACIDS.

1,260,535.

Specification of Letters Patent.

Patented Mar. 26, 1918.

No Drawing.

Application filed March 22, 1917. Serial No. 156,747.

*To all whom it may concern:*

Be it known that I, EDWARD G. GRIFFIN, a citizen of the United States, residing at Cliffside, in the county of Bergen and State of New Jersey, have invented certain new and useful Improvements in Processes of Making Salts of Anthraquinone Sulfonic Acids, of which the following is a specification.

This invention relates to the manufacture of salts of anthraquinone mono-sulfonic acids. While the process is applicable to either the $\alpha$ or the $\beta$ mono-sulfonic acid derivative of anthraquinone, and also to analogous substances, I shall describe the process particularly in connection with the $\beta$ acid referred to. Moreover, while the process may be utilized for the production of such salts of any one of the alkali metals, I shall, by way of example, describe my process with relation to the manufacture of the sodium salt of anthraquinone $\beta$ mono-sulfonic acid, commonly referred to as "silver salt." However, it is to be understood that, except as certain of the claims may specifically include such limitations, my invention is not to be limited or restricted to any particular one of the metals or of the mono-sulfonic acid derivatives of anthraquinone mentioned, but comprises all such metals and acids.

Hitherto salts, such as the sodium salt, for example, of one of the anthraquinone mono-sulfonic acids, such as the $\beta$ acid, have been prepared by treating the desired anthraquinone mono-sulfonic acid with the hydroxid, oxid, or carbonate of the metal whose salt it was desired to obtain. These compounds are comparatively expensive. I have discovered that, in place of the carbonates, oxids or hydroxids previously employed, a much cheaper material may be used with equal success and without any diminution in the yield of the salt desired to be obtained.

Briefly stated, then, my process comprises the treatment of either the $\alpha$ or $\beta$ anthraquinone mono-sulfonic acid with the alkali metal salt of any of the usual mineral acids. In preparing the sodium salt of the $\beta$ acid, for example, I may use the sulfate (normal or acid), the chlorid, or any other mineral acid salt of sodium.

The purpose in employing a mineral acid salt of one of the alkali metals is that the anthraquinone mono-sulfonates of such metals are comparatively insoluble while the anthraquinone di-sulfonates are comparatively soluble. Accordingly, by the addition of an alkali metal salt of a mineral acid, the corresponding mono-sulfonate is precipitated, thereby effecting its separation from any anthraquinone di-sulfonic acids (usually the 2:6 and 2:7 acids) present in the solution to which the mineral acid alkali metal salt is added. This point is of great practical importance since by the usual method of preparation, the anthraquinone mono-sulfonic acid is almost always associated with a substantial amount of anthraquinone di-sulfonic acids. By my method I am enabled to obtain the desired mono-sulfonate substantially free from anthraquinone di-sulfonic acids or their salts, and at the same time carry out this process in such a way as to effect such a separation of the two classes of acids that the di-acids may be obtained in a substantially uncontaminated form free from any mono-acids or their salts, for any purpose for which the di-acids may be desired.

While any mineral acid salt of an alkali metal may be employed with success in my process, I prefer to use a sulfate, since by the use of such a sulfate, inasmuch as the free acid present in the original acid solution of the mono- and di-acids is sulfuric acid, but one acid radical will be present in the solution, rendering the subsequent purification of the various products simple and feasible. Especially is this the case in the subsequent recovery and purification of the di-acids in the filtrate obtained after filtering off the crystals of insoluble alkali metal salt of anthraquinone mono-sulfonic acid. In this instance, by treating the di-acid solution with lime, the free sulfuric acid is entirely eliminated in the form of calcium sulfate without leaving any appreciable amount of contaminating substance behind. Of such alkali metal mineral acid salts I prefer to use sodium sulfate as possessing all the desired advantages above set forth and in addition as being one of the cheapest substances obtainable.

However, it is to be understood that other mineral acid salts of the desired metal, whether such salts are neutral, acid, or basic, may be employed. Throughout the specification and claims wherever the phrase "anthraquinone mono-sulfonic acid" appears I mean to designate both the α and β acids or mixtures of such acids.

In practising my process, I treat any desired quantity of either the α or the β anthraquinone mono-sulfonic acid, in solution, with a sufficient amount of the alkali metal salt of any mineral acid to supply enough of the metal radical to produce the desired salt of the anthraquinone mono-sulfonic acid according to the following reaction:

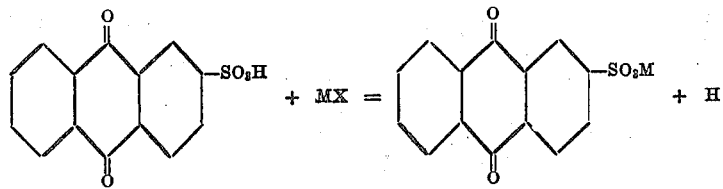

where M stands for any alkali metal and X for any mineral acid radical, the β acid being indicated by way of example. The reaction is entirely analogous in the case where the α acid is used.

It is immaterial for the purposes of my present invention, how the solution of either the α or the β acid is obtained. A solution of the β acid may be obtained as follows: Any desired amount of anthraquinone is heated with an excess of fuming sulfuric acid or "oleum" at about 170° for about 10 hours. The hot sulfonated mixture is poured slowly with stirring into several times its volume of cold water and the resulting mass is boiled and filtered. The unsulfonated anthraquinone is washed with water and the wash water is added to the first filtrate. The filtrate consists principally of anthraquinone mono-sulfonic acid, together with a substantial amount of anthraquinone di-sulfonic acids all in acid solution, the free acid being sulfuric acid.

However obtained, the solution of either the α or β mono-sulfonic acid is treated with either a normal or acid mineral acid salt of the desired alkali metal. Of such salts, I prefer to use the sulfates, for the reason already set forth. Using normal sodium sulfate and the β acid, for example, the following reaction takes place:

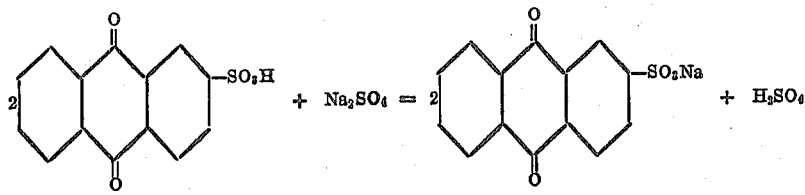

The sodium sulfate may be added either in the form of crystals (Glauber's salt), in the form of an anhydrous powder, or as an aqueous solution. Enough of the sulfate is added to neutralize the β acid present. After the action is complete, the mixture is concentrated, and after cooling, the thick crystalline mass is filtered and washed several times with a 10% sodium sulfate solution. The di-sulfonic acid compounds, being comparatively very soluble, do not crystallize out of the solution with the anthraquinone mono-sulfonic acid salt, and the latter is accordingly obtained in a substantially pure condition. In a similar manner the sodium or other alkali salts of either the α or β anthraquinone mono-sulfonic acid may be obtained by treatment of either the α or β acid, as desired, with a mineral acid salt, either normal or acid, of the desired metal.

What I claim is:

1. The process of forming salts of anthraquinone mono-sulfonic acid which comprises the step of treating such acid with an alkali metal salt of sulfuric acid, substantially as described.

2. The process of forming salts of anthraquinone β mono-sulfonic acid which comprises the step of treating such acid with an alkali metal salt of sulfuric acid, substantially as described.

3. The process of forming the sodium salts of anthraquinone mono-sulfonic acid which comprises the step of treating such acid with the sodium salt of such a mineral acid as will form a precipitate, and separating the precipitate from the liquid portion, substantially as described.

4. The process of forming the sodium salts of anthraquinone mono-sulfonic acid which comprises the step of treating such acid with sodium sulfate, substantially as described.

5. The process of forming the sodium salt of anthraquinone β mono-sulfonic acid which comprises the step of treating such acid with the sodium salt of a mineral acid, substantially as described.

6. The process of forming the sodium salt of anthraquinone β mono-sulfonic acid which comprises the step of treating such acid with sodium sulfate, substantially as described.

7. The process of effecting a separation and recovery of anthraquinone mono-sulfonic and di-sulfonic acids in a solution containing such acids, which comprises the steps of adding a mineral acid salt of an alkali metal to such solution and filtering off the comparatively insoluble alkali metal anthraquinone mono-sulfonate formed, whereby the anthraquinone di-sulfonic acids are left in the filtrate substantially free from anthraquinone mono-sulfonic acid and its salts, substantially as described.

8. The process of effecting a separation and recovery of anthraquinone mono-sulfonic and di-sulfonic acids in a solution containing such acids, which comprises the steps of adding a sulfate of an alkali metal to such solution and filtering off the comparatively insoluble alkali metal anthraquinone mono-sulfonate formed, whereby the anthraquinone di-sulfonic acids are left in the filtrate substantially free from anthraquinone mono-sulfonic acid and its salts, substantially as described.

9. The process of effecting a separation and recovery of anthraquinone mono-sulfonic and di-sulfonic acids in a solution containing such acids, which comprises the steps of adding sodium sulfate to such solution, and filtering off the comparatively insoluble sodium anthraquinone mono-sulfonate formed whereby the anthraquinone di-sulfonic acids are left in the filtrate substantially free from anthraquinone mono-sulfonic acid and its salts, substantially as described.

10. The process of effecting a separation and recovery of anthraquinone mono-sulfonic and di-sulfonic acids in a solution containing such acids, which comprises the steps of adding sodium sulfate to such solution, filtering off the comparatively insoluble sodium anthraquinone mono-sulfonate formed, whereby the anthraquinone di-sulfonic acids are left in the filtrate substantially free from anthraquinone mono-sulfonic acid and its salts, and recovering the di-sulfonic acids in a comparatively pure form, substantially as described.

In testimony whereof I affix my signature.

EDWARD G. GRIFFIN.